(12) United States Patent
Amadi et al.

(10) Patent No.: US 12,269,423 B2
(45) Date of Patent: Apr. 8, 2025

(54) VEHICLE HAVING IMAGING DEVICE FOR PET DETECTION AND CONTROL

(71) Applicant: Ford Global Technologies, LLC, Dearborn, MI (US)

(72) Inventors: Lawrence Amadi, Nottingham, MD (US); Stuart C. Salter, White Lake, MI (US); John Robert Van Wiemeersch, Novi, MI (US); Hussein H. Berry, Dearborn, MI (US); Annette Lynn Huebner, Highland, MI (US); Marguerite Lynn Kimball, Brighton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 314 days.

(21) Appl. No.: 17/571,646

(22) Filed: Jan. 10, 2022

(65) Prior Publication Data

US 2023/0219527 A1    Jul. 13, 2023

(51) Int. Cl.
| | |
|---|---|
| *B60R 25/25* | (2013.01) |
| *B60R 25/01* | (2013.01) |
| *B60R 25/30* | (2013.01) |
| *E05B 81/64* | (2014.01) |
| *E05F 15/73* | (2015.01) |
| *G06V 20/58* | (2022.01) |
| *G06V 40/10* | (2022.01) |
| *G06V 40/20* | (2022.01) |

(52) U.S. Cl.
CPC ............. *B60R 25/25* (2013.01); *B60R 25/01* (2013.01); *B60R 25/305* (2013.01); *E05B 81/64* (2013.01); *E05F 15/73* (2015.01); *G06V 20/58* (2022.01); *G06V 40/10* (2022.01); *G06V 40/25* (2022.01); *E05F 2015/767* (2015.01); *E05Y 2400/45* (2013.01); *E05Y 2900/531* (2013.01)

(58) Field of Classification Search
CPC ....... B60R 25/25; B60R 25/01; B60R 25/305; E05F 15/73; E05F 2015/757; G06V 20/58; G06V 40/10; G06V 40/25; E05B 81/64; E05Y 2400/45; E05Y 2900/531
See application file for complete search history.

(56) References Cited

U.S. PATENT DOCUMENTS

| | | |
|---|---|---|
| 7,945,076 B2 | 5/2011 | DeLean |
| 2012/0098231 A1* | 4/2012 | Huotari ................ B60R 3/02 280/166 |

(Continued)

OTHER PUBLICATIONS

RGBD-Dog: Predicting Canine Pose from RGBD Sensors (Year: 2020).*

*Primary Examiner* — Anne Marie Antonucci
*Assistant Examiner* — Luis G Del Valle
(74) *Attorney, Agent, or Firm* — Frank Lollo; Price Heneveld LLP

(57) ABSTRACT

A vehicle is provided that includes an imaging device located on the vehicle and oriented to capture images, memory storing one or more pet profiles, and a controller processing the captured images to detect a pet and determining at least one of an estimated pose of the pet and a gait of the pet, wherein the processor determines a bone structure of the pet from the at least one estimated pose and gait and compares the bone structure to the one or more pet profiles to detect an authorized pet, the controller controlling one or more vehicle related features based on the detected authorized pet.

19 Claims, 3 Drawing Sheets

(56) References Cited

U.S. PATENT DOCUMENTS

| | | |
|---|---|---|
| 2013/0216094 A1 | 8/2013 | DeLean |
| 2013/0249669 A1* | 9/2013 | Zwiener ............... G06F 21/32 340/5.53 |
| 2018/0016835 A1* | 1/2018 | Ichinose ............... E05F 15/73 |
| 2019/0118603 A1* | 4/2019 | Feit ..................... B60G 11/27 |
| 2020/0202117 A1* | 6/2020 | Wu ...................... G06F 21/32 |
| 2020/0202511 A1* | 6/2020 | Robertson ............. G06N 20/00 |
| 2020/0406860 A1 | 12/2020 | Mai et al. |
| 2021/0337387 A1* | 10/2021 | Ueno ................... H04W 12/122 |
| 2022/0019767 A1* | 1/2022 | Burk .................... G06F 18/217 |
| 2023/0103458 A1* | 4/2023 | Williams .............. B60R 3/002 701/49 |
| 2023/0158987 A1* | 5/2023 | Yamane ................ B60R 21/20 280/728.2 |

\* cited by examiner

VEHICLE HAVING IMAGING DEVICE FOR PET DETECTION AND CONTROL

FIELD OF THE DISCLOSURE

The present disclosure generally relates to a vehicle having user recognition, and more particularly relates to a vehicle capturing images of a pet and identifying the pet and controlling vehicle functions.

BACKGROUND OF THE DISCLOSURE

Motor vehicles are commonly equipped with various imaging devices, such as cameras that are located both on the exterior and the interior of the vehicle. The cameras can monitor the presence of users, such as occupants and pets both outside and inside the vehicle. Captured images can be processed to recognize the driver or passengers using facial recognition. It may be somewhat difficult at times to identify a particular pet based on facial recognition. It may be desirable to provide for a detection system that detects and identifies a pet and provides related control functions onboard the vehicle.

SUMMARY OF THE DISCLOSURE

According to a first aspect of the present disclosure, a vehicle is provided that includes an imaging device located on the vehicle and oriented to capture images, memory storing one or more pet profiles, and a controller processing the captured images to detect a pet and determining a bone structure of the pet from the captured images and comparing the bone structure to the one or more pet profiles to detect an authorized pet, the controller controlling one or more vehicle related features based on the detected authorized pet.

Embodiments of the first aspect of the disclosure can include any one or a combination of the following features:
 the controller determines an estimated pose of the pet from the captured images and determines the bone structure based on the estimated pose;
 the controller determines a gait of the pet from a sequence of estimated poses and determines the bone structure based on the gait;
 the controller determines a state of the authorized pet and the controller controls a feature based on the determined state;
 the memory contains a plurality of stored pet profiles matched to stored bone structures of pets;
 the imaging device captures images proximate the exterior of the vehicle and controls a vehicle door based on the detected authorized pet;
 the controller actuates an actuator to open the door;
 the controller actuates an actuator to unlock the door;
 the imaging device captures images in the interior of the vehicle; and
 the imaging devices comprises a camera.

According to a second aspect of the present disclosure, a vehicle is provided that includes an imaging device located on the vehicle and oriented to capture images of a space proximate to an exterior or interior of the vehicle, and memory storing one or more pet profiles including bone structure parameters of known pets. The vehicle also includes a controller processing the captured images to detect a pet and determining at least one of an estimated pose of the pet and a gait of the pet, wherein the processor determines a bone structure of the pet from the at least one of the estimated pose and gait and compares the bone structure to the bone structure parameters of the one or more pet profiles to detect an authorized pet, the controller controlling one or more vehicle related features based on the detected authorized pet.

Embodiments of the second aspect of the disclosure can include any one or a combination of the following features:
 the imaging device captures images proximate the exterior of the vehicle and controls a vehicle door based on the detected authorized pet;
 the controller actuates an actuator to open the door;
 the controller actuates an actuator to unlock the door;
 the imaging device captures images in the interior of the vehicle; and
 the imaging devices comprises a camera.

According to a third aspect of the present disclosure, a method of detecting an authorized pet and controlling one or more vehicle related features on a vehicle is provided. The method includes the steps of capturing images with an imaging device located on the vehicle, storing one or more pet profiles in memory, the one or more pet profiles including bone structure of known pets, and processing the captured images with a controller to detect a pet. The method also includes the steps of determining a bone structure of the pet from the captured images, comparing the bone structure to the one or more stored pet profiles to detect an authorized pet, and controlling one or more vehicle related features based on the detected authorized pet.

Embodiments of the third aspect of the disclosure can include any one or a combination of the following features:
 determining an estimated pose of the pet from the captured images, wherein the bone structure is determined based on the estimated pose;
 determining a gait of the pet from a sequence of estimated poses, wherein the bone structure is determined based on the gait; and
 the one or more vehicle related features comprises a powered vehicle door.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
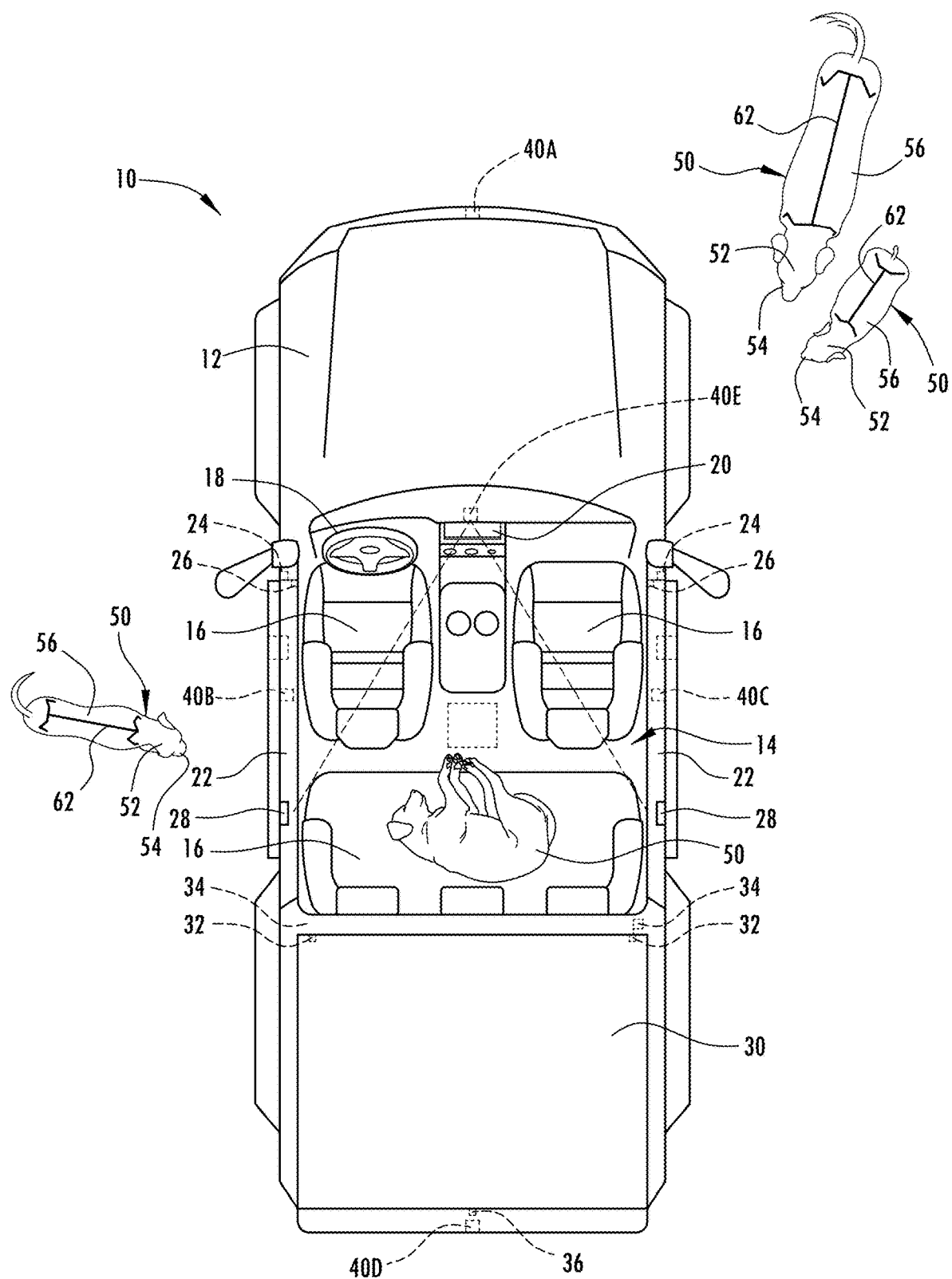
FIG. 1 is a schematic top view of a motor vehicle equipped with image recognition of pets and vehicle controls.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle having pet recognition and vehicle controls. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIG. 1, a wheeled automotive or motor vehicle 10 is generally illustrated having a cabin interior 14 defined by a vehicle body 12 and configured with passenger seating for transporting users such as passengers and pets in the vehicle 10. The cabin interior 14 is generally defined by the vehicle body 12 and may include various features and trim components within the cabin interior 14. The cabin interior 14 may include an arrangement of passenger seats 16 including a first or front row of driver and passenger seats generally located towards the front of the cabin interior 14 and one or more rows of passenger seats located rearward of the front row of passenger seats. The vehicle 10 may be equipped with a steering wheel 18 located in front of the driver seat to enable the driver to steer the vehicle road wheels. Additionally, one or more human machine interfaces (HMI), such as a touchscreen display 20, audio speakers, microphone, etc., may be provided on the vehicle 10 to communicate with the driver and one or more passengers in the vehicle 10.

The vehicle 10 is equipped with power actuated doors and user detection, including pet detection and identification, and controls for controlling vehicle functions, such as actuation of the doors 22 of the vehicle 10 between open and closed positions to allow authorized users, such as a driver, passengers and one or more pets to enter or exit the vehicle 10. The vehicle 10 has a plurality of powered closure doors that include two side passenger doors 22 on opposite lateral sides of the vehicle 10. In addition, the vehicle 10 has a powered rear trunk door 30 such as a powered liftgate or tailgate at the rear of the vehicle 10. Each of the powered doors 22 and 30 may close a space, such as a space of the cabin interior 14 in a closed position and allow access to the cabin interior 14 in an open position. The powered doors 22 and 30 are power operated doors, each having an actuator, such as an electric motor, for moving the corresponding door between the closed and open positions. The powered doors may also have powered latches to lock and unlock, or unlatch the doors. The actuators may move the powered doors between the open and closed positions or lock and unlock the doors in response to detecting an authorized pet approaching the vehicle 10, for example. The powered doors may thereby be opened by the corresponding actuators in response to detecting the pose and bone structure of the authorized pet. The powered doors may be controlled to open to any of a plurality of open positions and at different opening and closing speeds.

It should be appreciated that the vehicle 10 may include more than two side doors, such as four side doors. The vehicle 10 may be a motor vehicle, such as a wheeled car, truck, SUV, van or bus, for example, having one or more powered doors. Each of the powered doors moves relative to the body 12 of the vehicle 10 between a closed positon and an extended open positon and therefore may require sufficient space to move between the closed and open door positions. The processing and controls advantageously assist with identification of an authorized pet and operation of the powered doors and other controllable vehicle devices or features.

Each of the side doors 22 may include a door panel and one or more windows. The side doors 22 each pivot about hinges 24 generally along a vertical axis to allow the door 22 to swing outward through a swing path to an open door position or inward to a flush position with the body 12 of the vehicle 10 where it may be latched via latch 28 in the closed door position. The side doors 22 are powered with an actuator, such as an electric motor 26 which may be located at or near one of the hinges to power actuate and thereby move the powered door 22 between the closed and open positions. The side doors may also include a switch to receive a door open or door closed input from a user, such as a driver to initiate door actuation. The one or more windows may be actuated by a motor to move between open and closed positions.

The vehicle 10 has a rear trunk door 30 which may be a trunk, liftgate or tailgate that pivots between the closed and open positions. The rear trunk door 30 pivots about a pair of horizontal hinges 32 and is actuated by an actuator, such as an electric motor 34. The rear trunk door 30 may provide access to the cabin interior 14.

The vehicle 10 is equipped with a plurality of imaging sensors that are located and oriented on the vehicle 10 for sensing objects such as potential users, e.g., driver, passengers and pets. Exterior imaging sensors may detect authorized users including pets expected to enter the vehicle 10 and within a space surrounding the vehicle 10. One or more interior imaging sensors may detect authorized users including pets located within the vehicle 10. The plurality of imaging sensors generate signals in the form of images showing the sensed objects. The plurality of imaging sensors may include a plurality of imaging devices, such as two exterior side view cameras 40B and 40C, which are shown located on opposite lateral sides of the vehicle 10 shown near the roof and forward of the B-pillars, a lower exterior front view camera 40A shown in a front fascia of the vehicle 10, a rear exterior view camera 40D shown in a rear fascia of the vehicle 10, and a rearward oriented interior view camera 40E shown mounted near the dashboard. Each of the exterior cameras 40A-40D may acquire images of zones in the space around the perimeter of the vehicle 10, including covering the door detection regions covering the entrance for the powered doors. The interior camera 40E acquires images of the interior cabin of the vehicle 10. The acquired images may be processed by a controller using video processing to identify objects such as one or more people and pets as potential authorized users and the position of the people and pets relative to the vehicle 10 and the powered doors 22 and the pose and bone structure presented by the pets.

The vehicle 10 may also be equipped with a plurality of sensors that may include radar sensors located, for example, at each of the four corners of the vehicle 10 for sensing objects located outside of the vehicle and within the space surrounding the vehicle 10, within the cabin interior 14 of the vehicle 10. The radar sensors transmit radio waves and process their reflections from one or more objects to determine distance to the object(s) and location of the object(s). Further, the plurality of sensors may include a plurality of ultrasonic sensors located, for example, at various locations along the front portion and rear portions of the vehicle 10. As such, the radar and ultrasonic sensors may be used to detect the location, size and relative distance from the vehicle 10 to the detected object(s). It should be appreciated that other sensors may be employed by the vehicle 10 to sense objects, such as potential authorized users including authorized pets, relative to the vehicle 10, including objects proximate the powered doors, and generate sensed signals that may be used to identify each object and the distance and location of the sensed object(s) relative to the vehicle 10 for use in assisting with the controllable features of the vehicle 10 including controlling the powered doors of the vehicle 10.

The vehicle 10 is shown having a pet 50, such as a dog, for example, located laying down on the rear seat 16 within the cabin interior 14 of vehicle 10. The pet 50 located within the interior of the vehicle 10 is shown laying down on the rear seat 16 in a comfortable sleeping position. In addition, a plurality of additional pets 50 are shown located outside of the vehicle 10 in close proximity to the vehicle 10. Each of the pets 50 may include a pet, such as a dog, a cat or other animal that may be transported within a passenger vehicle. The pets 50 shown located on the outside of the vehicle 10 may approach the vehicle 10 to gain access for entry to the cabin interior 14 of the vehicle 10. In doing so, the exterior imaging devices in the form of cameras 40A-40D may capture images that include one or more of the pets 50. The captured images may be processed by a processor in a controller to detect the presence of a pet and to determine an estimated pose of the pet 50 and a gait of the pet and may further determine a state of the authorized pet. Further, the processor may determine a bone structure of the pet 50 from at least one of the estimated pose and gait and compare the bone structure to one or more known pets and determine if the pet is an authorized pet that may enter the vehicle. The gait may be detected by monitoring a sequence of estimated poses, for example. The controller may then actuate one or more of the powered doors to move the door(s) to the open position to allow the authorized pet to enter the cabin interior 14.

The interior imaging device, shown as camera 40E, may detect the presence of a pet located within the cabin interior 14 of the vehicle 10. The images captured by the interior camera 40E may be processed by the processor in the controller to detect the presence of a pet and determine an estimated pose of the pet 50 which may include determining a bone structure of the pet 50 from the estimated pose. The processor may compare the bone structure to at least one or more known pet profiles to detect an authorized pet within the vehicle 10. In addition, the captured images from the interior camera 40E may be further processed to determine a state of the authorized pet, such as whether the pet is comfortable or stressed due to excessive temperature, too cool of a temperature, thirsty due to lack of drinking water, exposure to too much sunlight, lack of food or other stressful situations. A stressed or uncomfortable state of the pet may be determined by comparing the images to images of known uncomfortable or stressed pets. The stressed or uncomfortable state may be remedied by controlling one or more vehicle features. For example, the controller may open or close a sunroof or other window or windows of the vehicle 10 if the pet is determined to be uncomfortable due to excessive heat or may close a sunshade such as a moonroof or window shade if the pet is determined to be subjected to too much sunlight. The controller may open a powered door to allow the pet to exit the vehicle 10. The controller may further provide instructions to a user on an HMI, such as the touchscreen display 20 if it is determined that the pet may be thirsty and require water or food or to otherwise report the condition of the pet.

Figure 2:
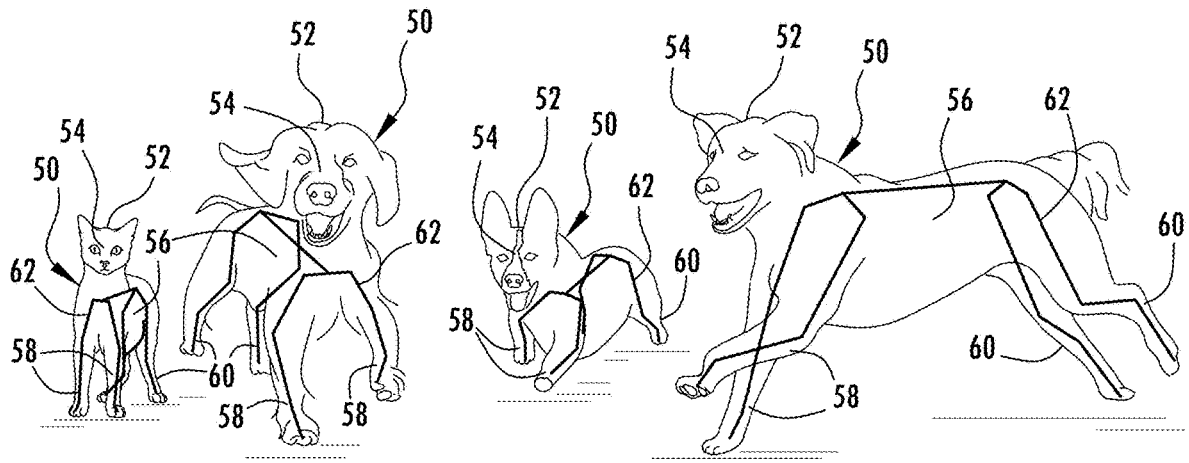
FIG. 2 is a schematic view of a plurality of pets captured in an image and overlaying lines showing identification of the pose and bone structure of each pet.

A plurality of pets 50 are further illustrated in FIG. 2 in images that are captured by one or more imaging devices such as an exterior camera and which may be processed by the processor in the controller as described herein. Each of the pets 50 shown has a distinct body shape with distinct characteristics that may be identified by processing the captured images. Each pet 50 shown has a head 52 with a face 54 and a body 56. Each of the head 52, face 54 and body 56 of each pet may vary from one pet to another. The processor affiliated with the controller may look at facial recognition of the pet to identify the head 52 and face 54 to try to identify the pet, however, many pets of the same breed have similar looking heads and faces. In addition, the processor of the controller may process the body 56 of the pet to determine an estimated pose of the pet and/or a gait of the pet as the pet walk or moves and an estimated bone structure which is shown by lines 62. The bone structure lines of a pet are further distinguishing characteristic that may be used to determine one pet from another pet so as to be able to determine whether a pet is authorized for entry or for controlling one or more features onboard the vehicle 10. The bone structure lines 62 may be detected by estimating the bone structure extending through the front legs 58 and the rear legs 60 across the body 56 of each pet 50 taken from the pose or gait. The bone structure 62 has a shape and has length of each of the components within the legs 58 and 60 and the body 56 which may be compared to known bone structures for authorized pets. The controller may thereby detect an authorized pet based on the bone structure in addition to looking at other characteristics of the pet 50.

Figure 3:
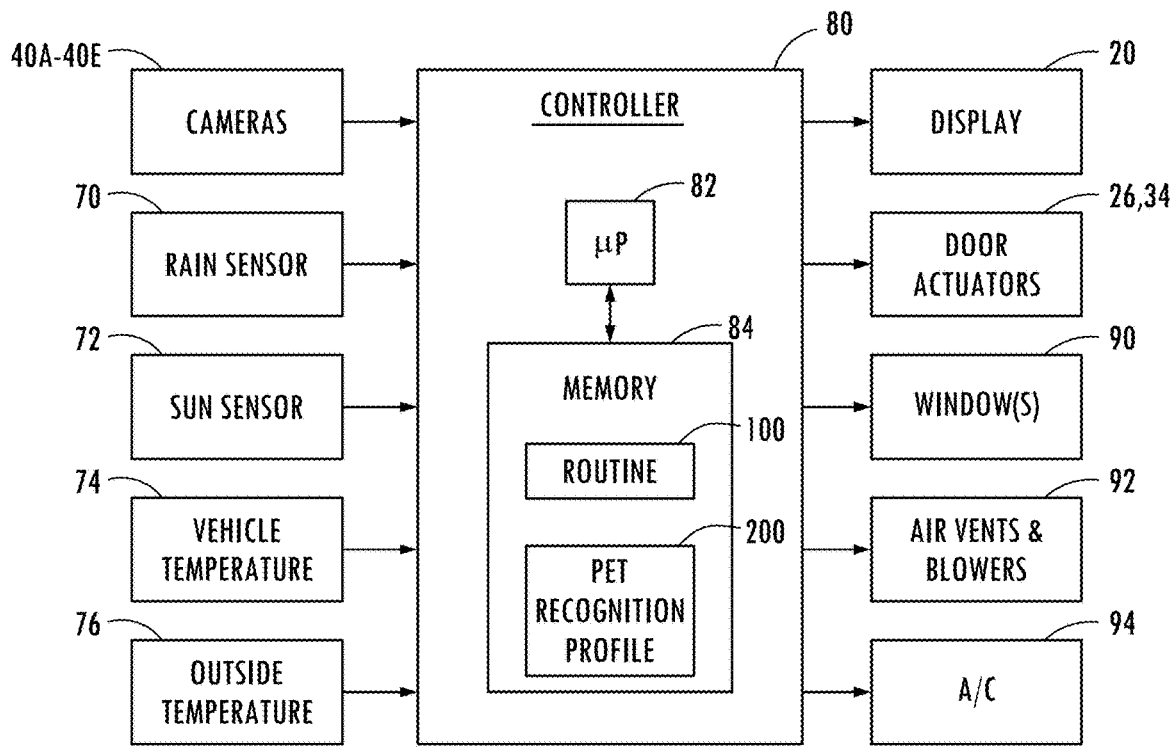
FIG. 3 is a block diagram illustrating a controller configured to process and identify pets and perform control functions.

Referring to FIG. 3, the vehicle 10 is shown having a vehicle controller 80 that detects an authorized pet either outside or inside the vehicle and controls one or more vehicle features. The vehicle controller 80 may include control circuitry, such as a microprocessor 82 and memory 84. It should be appreciated that the vehicle and controller may be comprised of analog and/or digital control circuitry. Stored in memory 84 are one or more routines including routine 100 which may be executed by the microprocessor 82. In addition, various stored pet recognition profiles 200 may be stored in memory 84 and processed by the microprocessor 82. The stored pet recognition profiles 200 may include stored parameters including facial characteristics, body characteristics, bone structure characteristics, and pose characteristics of known authorized pets that have been entered into the database for use to determine identification of an authorized pet of the vehicle 10. The stored pet recognition parameters 200 may include parameters that are recorded during a training process or learned with machine learning or artificial intelligence, for example.

The controller 80 is shown receiving inputs from each of the cameras 40A-40E. In addition, the controller 89 receives inputs from a rain sensor 70, a sun sensor 72, a vehicle interior temperature sensor 74 and a vehicle outside temperature sensor 76. The controller 80 may process the images captured by the cameras 40A-40E in combination with the various sensors pursuant to routine 100 and may generate control signals to control any of a number of devices. The control of devices or features may include controlling the door actuators 26 and 34 between open and closed door positions, controlling windows 90 between open and closed positions, controlling air vents and blowers 92 and controlling air conditioning 94, for example. In addition, the controller 80 may communicate with the touchscreen display 20 to display information to the driver and passengers of the vehicle 10.

Figure 4:
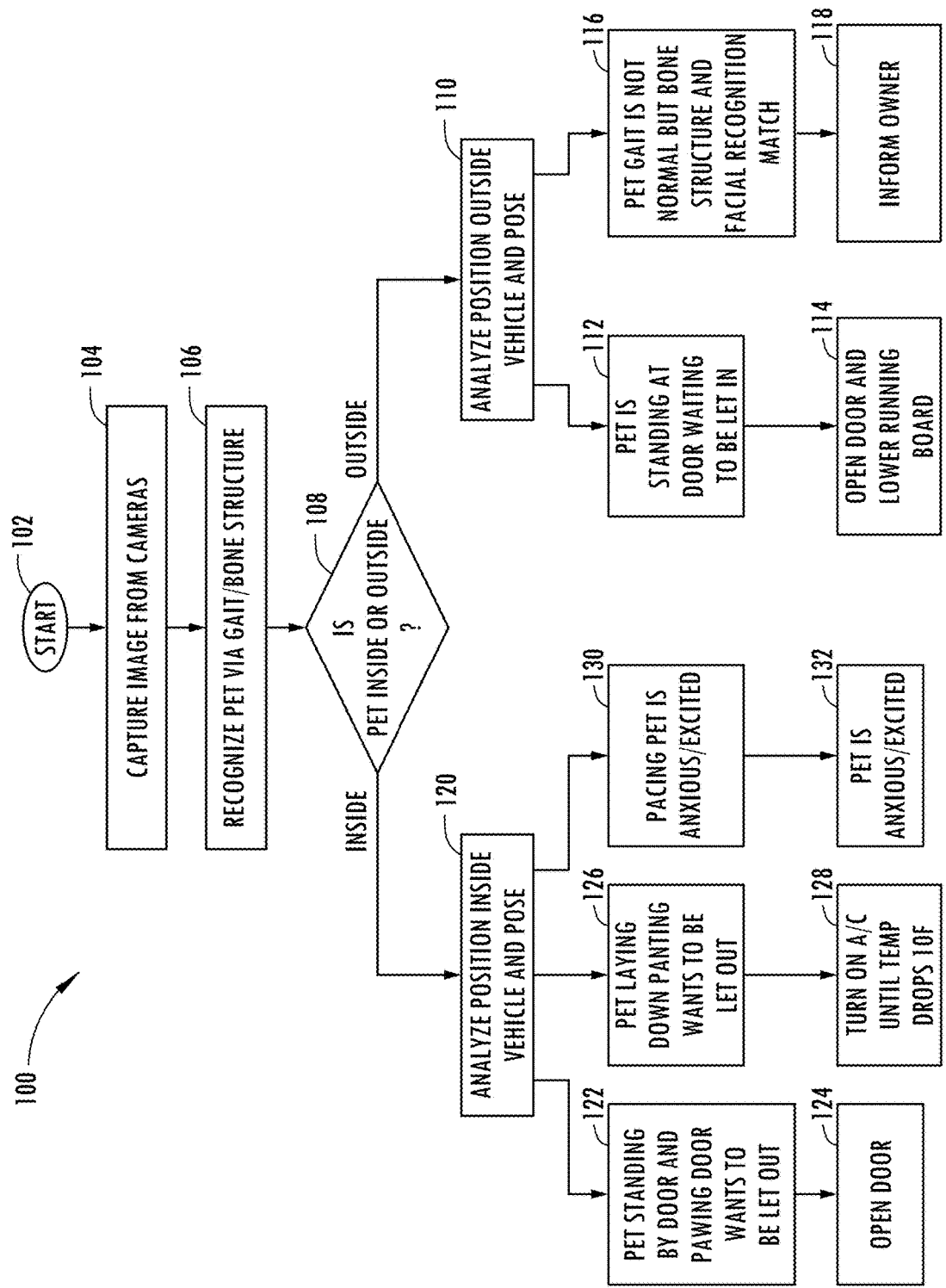
FIG. 4 is a flow diagram illustrating a routine for identifying pets and controlling vehicle functions, according to one example.

Referring to FIG. 4, a routine 100 is illustrated for identifying potential pets and controlling one or more devices or features related to the vehicle 10. Routine 100 begins at step 102 and proceeds to step 104 to capture images from the cameras. Next, at step 106, routine 100 processes the captured images to detect a pet and recognize a pet via the pose and/or gait and/or bone structure of the pet. Proceeding to decision step 108, routine 100 will determine if the pet is detected inside or outside of the vehicle. If the pet is detected outside of the vehicle, routine 100 will proceed to step 110 to analyze the position of the pet outside of the vehicle and the pose and/or gait of the pet. If the pet is standing at the door waiting to be let in the vehicle as determined by step 112, routine 100 will open the door and may lower the running board(s) of the vehicle at step 114. If the pet gait is determined to not be normal, but the bone structure and facial recognition match at step 116, routine 100 will inform the owner such as the driver of the vehicle at step 118.

If the pet is determined to be detected inside of the vehicle, routine 100 will proceed to step 120 to analyze the position of the pet inside the vehicle and the pose of the pet. If the pet is standing by the door and pawing at it such that the pet wants to be let out as determined in step 122, routine 100 may proceed to open a door of the vehicle at step 124 if such action has been pre-authorized by the vehicle customer and the system has been enabled. If the pet wants to be let out while lying down and panting as determined by step 126, routine 100 will turn on the air conditioning until the temperature drops to a certain temperature at step 128. Other actions include warning the vehicle such as via remote start if the detected condition is a shivering pet. If the pet is pacing such that it is anxious or excited at step 130, routine 100 will proceed to step 132 to inform the driver that the pet is anxious and excited.

Accordingly, the vehicle 10 advantageously monitors for the presence of a pet 50 either inside or outside of the vehicle 10 and looks for the bone structure 62, gait and pose of the pet 50 to automatically detect an authorized pet and further controls one or more vehicle features on the vehicle 10. The vehicle 10 may advantageously enhance the travel experience for pets and pet owners for transportation within a vehicle.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle comprising:
   a plurality of imaging sensors, including one or more interior imaging sensors and one or more exterior imaging sensors, located on the vehicle and oriented to capture images;
   memory storing one or more pet profiles matched to bone structures of potential authorized pets; and
   a controller processing the captured images to detect a pet and a position of the pet inside or outside the vehicle and determining a bone structure of the pet from the captured images by estimating the bone structure extending through front legs and rear legs and across the body of the detected pet, the bone structure including a shape and a length of each of the components of the front legs and rear legs and the body of the pet, and comparing the bone structure to the one or more pet profiles to detect that the detected pet is an authorized pet based on the bone structure, the controller further determining a state of activity of the pet including at least one of the pet pawing at a door, the pet panting, the pet shivering and the pet anxious and excited, the controller controlling one or more vehicle related features based on the detected authorized pet, the location of the detected authorized pet, and the state of activity of the pet, wherein the one or more vehicle related features comprises one or more of movement of the door, movement of a vehicle window, temperature within the vehicle, and movement of a running board.

2. The vehicle of claim 1, wherein the controller determines an estimated pose of the pet from the captured images and determines the bone structure based on the estimated pose.

3. The vehicle of claim 1, wherein the controller determines a gait of the pet from a sequence of estimated poses and determines the bone structure based on the gait.

4. The vehicle of claim 1, wherein the memory contains a plurality of stored pet profiles matched to stored bone structures of pets.

5. The vehicle of claim 1, wherein the one or more exterior imaging sensors captures images proximate the exterior of the vehicle and controls the door based on the detected authorized pet.

6. The vehicle of claim 5, wherein the controller actuates an actuator to open the door.

7. The vehicle of claim 5, wherein the controller actuates an actuator to unlock the door.

8. The vehicle of claim 1, wherein the one or more interior imaging sensors captures images in the interior of the vehicle.

9. The vehicle of claim 1, wherein the plurality of imaging sensors comprises a plurality of cameras.

10. A vehicle comprising:
a plurality of imaging sensors, including one or more interior imaging sensors and one or more exterior imaging sensors, located on the vehicle and oriented to capture images of a space proximate to an exterior or interior of the vehicle;
memory storing one or more pet profiles including bone structure parameters matched to bone structures of potential authorized pets; and
a controller processing the captured images to detect a pet and a position of the pet inside or outside the vehicle, and determining at least one of an estimated pose of the pet and a gait of the pet, wherein the controller determines a bone structure of the pet from the at least one of the estimated pose and gait by estimating the bone structure extending through front legs and rear legs and across the body of the detected pet, the bone structure including a shape and a length of each of the components of the front legs and rear legs and the body of the pet, and comparing the bone structure to the bone structure parameters of the one or more pet profiles to detect that the detected pet is an authorized pet based on the bone structure, the controller further determining a state of activity of the pet including at least one of the pet pawing at a door, the pet panting, the pet shivering and the pet anxious and excited, the controller controlling one or more vehicle related features based on the detected authorized pet, the location of the detected authorized pet, and the state of activity of the pet, wherein the one or more vehicle related features comprises one or more of movement of the door, movement of a vehicle window, temperature within the vehicle, and movement of a running board.

11. The vehicle of claim 10, wherein the one or more exterior imaging sensors captures images proximate the exterior of the vehicle and controls the door based on the detected authorized pet.

12. The vehicle of claim 11, wherein the controller actuates an actuator to open the door.

13. The vehicle of claim 11, wherein the controller actuates an actuator to unlock the door.

14. The vehicle of claim 10, wherein the one or more interior imaging sensors captures images in the interior of the vehicle.

15. The vehicle of claim 10, wherein the plurality of imaging sensors comprises a plurality of cameras.

16. A method of detecting an authorized pet and controlling one or more vehicle related features on a vehicle, the method comprising:
capturing images with a plurality of imaging sensors, including one or more interior imaging sensors and one or more exterior imaging sensors, located on the vehicle;
storing one or more pet profiles in memory, the one or more pet profiles including bone structure matched to bone structure of potential authorized pets;
processing the captured images with a controller to detect a pet and a position of the pet inside or outside the vehicle;
determining the bone structure of the pet from the captured images by estimating the bone structure extending through front legs and rear legs and across the body of the detected pet, the bone structure including a shape and a length of each of the components of the front legs and rear legs and the body of the pet;
comparing the bone structure to the one or more stored pet profiles to detect that the detected pet is an authorized pet based on the bone structure;
determining a state of activity of the pet including at least one of the pet pawing at a door, the pet panting, the pet shivering and the pet anxious and excited; and
controlling one or more vehicle related features based on the detected authorized pet and the determined state of activity of the pet.

17. The method of claim 16, further comprising determining an estimated pose of the pet from the captured images, wherein the bone structure is determined based on the estimated pose.

18. The method of claim 16, further comprising determining a gait of the pet from a sequence of estimated poses, wherein the bone structure is determined based on the gait.

19. The method of claim 16, wherein the one or more vehicle related features comprises a powered vehicle door.

* * * * *